UNITED STATES PATENT OFFICE.

FREDK. LANGENHEIM, OF PHILADELPHIA, PENNSYLVANIA.

IMPROVEMENT IN COLORING DAGUERREOTYPE-PLATES.

Specification forming part of Letters Patent No. 4,370, dated January 30, 1846.

*To all whom it may concern:*

Be it known that I, FREDERIK LANGENHEIM, of the city and county of Philadelphia, and State of Pennsylvania, have invented a new and useful Improvement in Coloring Daguerreotype-Plates by fixing the colors thereon; and I do hereby declare that the following is a full, clear, and exact description of the principle or character of my invention and its application.

In the invention of Isenring for coloring plates, for which Letters Patent have been obtained, a difficulty arose in making the colors adhere, and it was found in practice that after a little handling the color came off, and the picture was thus defaced. To remedy that defect is the object of my improvement.

Either before the plate receives the color or at the same time I cause an impalpable powder of gum-dammar, or other suitable resinous gum, to cover the parts to be colored in the manner described in the patent granted to me, as the assignee of Isenring—viz., by placing the plate in a close vessel, face up, with those parts covered that are not to be colored, and then filling the atmosphere contained in said vessel with the powder of gums above named and allowing a sufficient quantity to settle for the purpose intended. After the color is laid on the plates I submit it to a sufficient degree of heat to fuse the gum, which causes the color to adhere.

Having thus fully described my improvement, what I claim therein as my invention, and desire to secure by Letters Patent, is—

Fixing the colors on the plates by means of gum, applied substantially in the manner and for the purpose set forth.

FREDERIK LANGENHEIM.

Witnesses:
 THEODORE W. WODY,
 CHAUNCEY BURKLEY.